(12) United States Patent
Castro

(10) Patent No.: US 9,656,184 B1
(45) Date of Patent: May 23, 2017

(54) SLIDING JUMP CUP SYSTEM, METHOD AND APPARATUS

(71) Applicant: Cristobal Castro, Ocala, FL (US)

(72) Inventor: Cristobal Castro, Ocala, FL (US)

( * ) Notice: Subject to any disclaimer, the term of this patent is extended or adjusted under 35 U.S.C. 154(b) by 0 days.

(21) Appl. No.: 15/078,583

(22) Filed: Mar. 23, 2016

(51) Int. Cl.
*A01K 15/02* (2006.01)
*A63K 3/04* (2006.01)

(52) U.S. Cl.
CPC ............ *A63K 3/046* (2013.01); *A01K 15/027* (2013.01)

(58) Field of Classification Search
CPC ........ A63K 3/046; A63K 3/04; A01K 15/027; A63B 2208/14; A63B 2244/088; A63B 2244/24; A63B 5/02
USPC .......................... 119/705; 482/16, 17, 15, 38
See application file for complete search history.

(56) References Cited

U.S. PATENT DOCUMENTS

| | | | |
|---|---|---|---|
| 1,783,713 A | 12/1930 | Holman | |
| 1,902,995 A | 3/1933 | Flynn | |
| 2,279,539 A | 4/1942 | Vogt et al. | |
| 2,989,309 A | 6/1961 | Conrad | |
| 3,105,682 A | 10/1963 | Ahrens | |
| 3,209,729 A | 10/1965 | Zedaker | |
| 3,514,062 A * | 5/1970 | Gordon | A63B 5/02 119/705 |
| 3,749,344 A | 7/1973 | Racina | |
| 3,850,401 A * | 11/1974 | Snediker | A47B 97/02 211/101 |
| 4,323,034 A * | 4/1982 | Carlson | A01K 15/027 119/705 |
| 4,368,875 A * | 1/1983 | Weiss | A63K 3/046 119/705 |
| 4,827,873 A | 5/1989 | Wong | |
| 4,946,139 A | 8/1990 | Tomelliul et al. | |
| 4,989,821 A * | 2/1991 | Wong | A63K 3/046 119/705 |
| 5,334,119 A * | 8/1994 | Eloranta | A63K 3/046 482/16 |
| D365,263 S | 12/1995 | Sorensen et al. | |
| 5,690,583 A * | 11/1997 | Keusch | A63K 3/046 119/705 |
| 5,842,954 A | 12/1998 | Slupskiy | |
| 5,913,283 A * | 6/1999 | Coury | A63K 3/046 119/705 |

(Continued)

FOREIGN PATENT DOCUMENTS

| | | |
|---|---|---|
| EP | 0 989 894 B1 | 4/2000 |
| EP | 2 424 635 B1 | 3/2012 |

OTHER PUBLICATIONS

Retrieved Mar. 18, 2016 Pinless Jump Cup Burlingham Sports (—Stable Equipment Supplies—Training Accessories) https://www.valleyvet.com/ct_detail.html?pgguid=6f71992c-609f . . . iQAGLHdYVGjxHCv6yFtpwXCPqicDOgRM5n Qgd91BU7czEXe8g0aApuc8P8HAQ.

(Continued)

*Primary Examiner* — Yvonne Abbott-Lewis
(74) *Attorney, Agent, or Firm* — Patent-Arts PLLC; Gerard H. Bencen, Esq.

(57) ABSTRACT

A sliding jump cup system allows for the efficient modification of jump heights comprises a sliding jump cup and a shaft that serves as a sliding support for the cup and that can be mounted onto an existing jump standard or which itself serves the purpose of a standard.

8 Claims, 6 Drawing Sheets

(56) References Cited

U.S. PATENT DOCUMENTS

| | | | | |
|---|---|---|---|---|
| 5,967,093 | A * | 10/1999 | Vitt | A63K 3/046 |
| | | | | 119/705 |
| 6,263,835 | B1 * | 7/2001 | Santi | A63K 3/046 |
| | | | | 119/705 |
| 6,416,247 | B2 | 7/2002 | Beck et al. | |
| 6,715,448 | B1 * | 4/2004 | McComb | A63K 3/046 |
| | | | | 119/705 |
| 6,976,452 | B1 * | 12/2005 | Godsil | A63K 3/04 |
| | | | | 119/705 |
| 7,159,859 | B2 | 1/2007 | Fuller | |
| D563,203 | S * | 3/2008 | Benning | D8/354 |
| 7,984,696 | B2 * | 7/2011 | Horrocks | A63K 3/046 |
| | | | | 119/705 |
| 9,433,873 | B2 * | 9/2016 | Howard | A63K 3/046 |
| 2003/0084857 | A1 * | 5/2003 | Gavet | A63K 3/046 |
| | | | | 119/705 |
| 2004/0007418 | A1 | 1/2004 | Wittmeijer | |
| 2006/0283399 | A1 * | 12/2006 | Bolduc | A63B 1/005 |
| | | | | 119/705 |
| 2013/0228137 | A1 | 9/2013 | Gemino et al. | |

OTHER PUBLICATIONS

Retrieved Mar. 18, 2016 "Next Day Jumps" https://www.noxtdayjumps.com/horse-jumps/standards.

* cited by examiner

SLIDING JUMP CUP SYSTEM, METHOD AND APPARATUS

FIELD OF THE INVENTION

The invention relates primarily, but not exclusively, to the sport of horseback riding, particularly horse jumping, and, in particular, it relates to a new method, device and system for adjusting jump heights through a sliding jump cup system.

BACKGROUND OF THE INVENTION

Obstacles used in horse jumping are comprised of opposing vertically disposed posts, known as jump standards, which function in conjunction with mechanisms used to support rails that bridge the standards and over which the horse is trained to jump. The mechanism by which the standards support the bridging rails is known as a jump cup. A jump cup attaches to each of the standards, through different mechanisms. The jump cups attached to opposing standards support the bridging rail elevated at a pre-determined elevation from the ground so that the horse and rider are challenged to jump over the rail at the set height. Once that height is met, the opposing jump cups on opposing standards are moved to different heights to establish a jump challenge set at a new elevation. In general, the known methods for adjusting the jump cup height are burdensome to adjust to new heights.

The present invention provides an improved system, method and device which facilitates adjustment of the jump cup height by a sliding mechanism.

SUMMARY OF THE INVENTION

The present invention provides a cooperative system comprising a pair of self-standing shafts which perform the function of jump standards, or which are mountable onto vertically opposing jump standards, and a pair of slideable jump cups, each comprising a vertical through-passage for accommodating said shaft, over which said jump cup is positionable at desired heights to support a jump rail disposed between the jump cups affixed to said shafts which themselves are affixed to opposing standards or which themselves perform the function of standards.

The jump cup is manufactured either from interlockable units to form a unitary structure, or, preferably, is an element manufactured as a unitary element cast in aluminum, steel, plastic, or any other material of sufficient strength to support a jump rail and sustain impact in the event a horse strikes the rail while jumping over the rail. According to this embodiment of the invention, the jump cup comprises a housing comprising at least two elements: a passage along the vertical axis with a geometry and dimension sufficient to accommodate the shaft over which the jump cup housing is arranged to be slidably repositionable at a desired position on said shaft, and a cup for holding the jump rail at an elevation defined by the position at which the slidable jump cup housing is affixed along the shaft.

In one preferred embodiment, the passage comprises a ring and spring mechanism to maintain the ring in a set position on the shaft passing vertically through the housing, due to an off-axis relationship relative to the shaft, to thereby prevent the cup from sliding along the shaft when set in a desired position on the shaft, thereby maintaining a rail set in the cup portion at a desired elevation. To modify the position of the cup on the shaft, the spring mechanism is depressed to release the jump cup allowing the cup to be re-positioned at a different elevation along the shaft. Other mechanisms known in the art, such as a thumb screw or the like, may be used in place of the ring and spring mechanism, to affix the slideable jump cup at a desired vertical position along the shaft. In a further preferred embodiment, the jump cup further comprises a release mechanism such that, in the event a horse strikes the jump rail, the slideable jump cup is released from its vertically fixed position to thereby lower the jump rail and prevent injury to the horse, the rider or both. The slideable jump cup system according to this invention is inexpensive to deploy in an existing jump cup and standard system, or to install de novo, and meets a long-felt need for an improved jump cup system for supporting a rail over which horses and other animals are induced to jump.

DETAILED DESCRIPTION OF THE PREFERRED EMBODIMENTS OF THE INVENTION

The sliding jump cup according to this invention is designed to facilitate and add precision to the height adjustment mechanism of jump cups. In a preferred embodiment according to this invention, the sliding jump cup requires only one hand in order to adjust the vertical position of the jump cup, the position of which is adjustable to any position along a shaft which passes through the jump cup housing. Accordingly, the jump rail does not have to be lifted from the cup in order to reposition the jump cup to a new elevation because the jump cup fixation mechanism, once released, allows the jump cup to move freely along the vertical axis of the shaft by sliding on the shaft without ever needing to be detached from the shaft, and therefore from the standard, at any time. As a result, the sliding jump cup system according to this invention reduces the jump height adjustment or re-adjustment time and effort, thereby facilitating that process, permitting the time for adjustment of the height of the cup on a standard to be decreased to about one second and to be carried out with just one hand.

Figure 1:
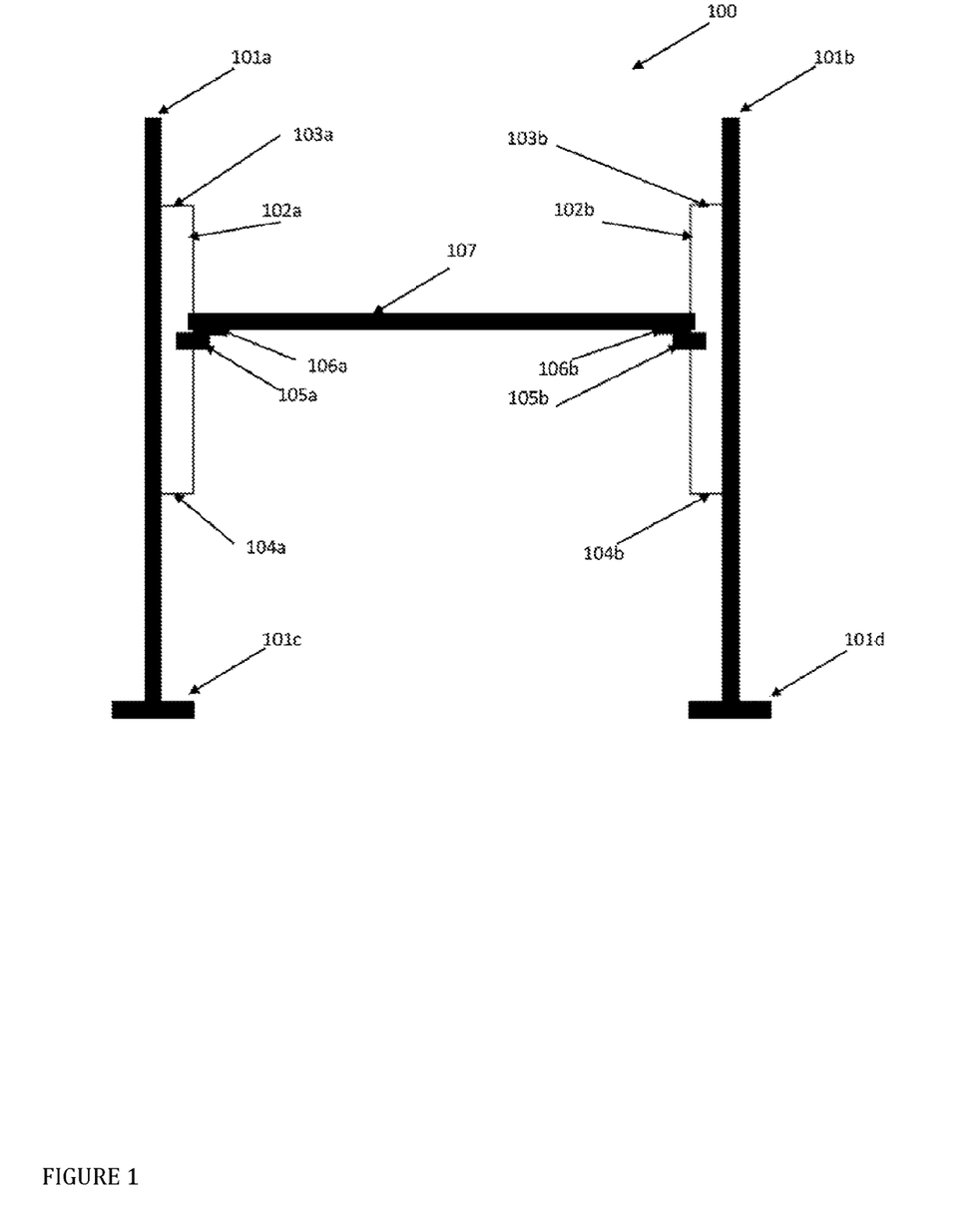
FIG. 1 provides a schematic of a first embodiment of the slideable jump cup system according to this invention.

Referring now to FIG. 1, there is provided a first schematic representation of the slideable jump cup system 100 according to this invention. According to this embodiment of the invention, a pair of standards, 101a (left standard as viewed in this figure) and 101b (right standard as viewed in this figure) are spaced apart from each other, and each is supported by a standard support means, such as a base 101c and 101d, respectively, or sunk into the ground if the standard is intended for non-moveable installation. In this embodiment, a shaft 102a and 102b is affixed to the left, 101a and right, 101b, standard, respectively, via an upper fixation means 103a and 103b respectively, and a lower fixation means 104a and 104b respectively, (see detail of one embodiment of the fixation means provided in FIG. 5), each said fixation means providing sufficient clearance to permit a housing 105a and 105b to slide up and down the left 102a and right 102b shafts, respectively, via the shaft passing vertically through a shaft passage 110 (see FIG. 3) defined through each housing.

Affixed to or unitary with each said housing 105a and 105b is a cup 106a and 106b respectively, upon which is placed a jump rail 107. The two standards 101a and 101b are spaced apart from each other sufficiently to accommodate the jump rail 107 when held by each cup 106a and 106b when aligned vertically via positioning and fixation of each housing 105 at a desired height on each shaft 102a and 102b. In a preferred embodiment, each shaft is notched or grooved at defined spaced-apart intervals into which a housing fixation means described further below, fits or snaps as the housing 105 is moved along each shaft 102.

The upper fixation means 103a and 103b respectively, and a lower fixation means 104a and 104b respectively, may be affixed by any known means to each standard 101a and 101b. In one embodiment, the fixation means 103a, 103b, 104a, and 104b comprise spacers which are permanently fixed to each standard, e.g. by simply welding or otherwise permanently fixing each spacer to each standard. In a preferred embodiment, the fixation means 103a, 103b, 104a, and 104b each consists of a spacer with one end of each spacer affixed by welding or bolts, or the equivalent to the upper and lower ends of each shaft 102, with the other end of each spacer ending in an adapter for removeably fitting into a slot of an existing jump cup mounting system, for example, in a lock and key type of fitting which securely fixes the shaft 102 to each standard, without each fixation point being permanently fixed to each standard (see one detailed embodiment enabling and describing this means of fixation in relation to the description provided below of FIG. 5).

Figure 5:
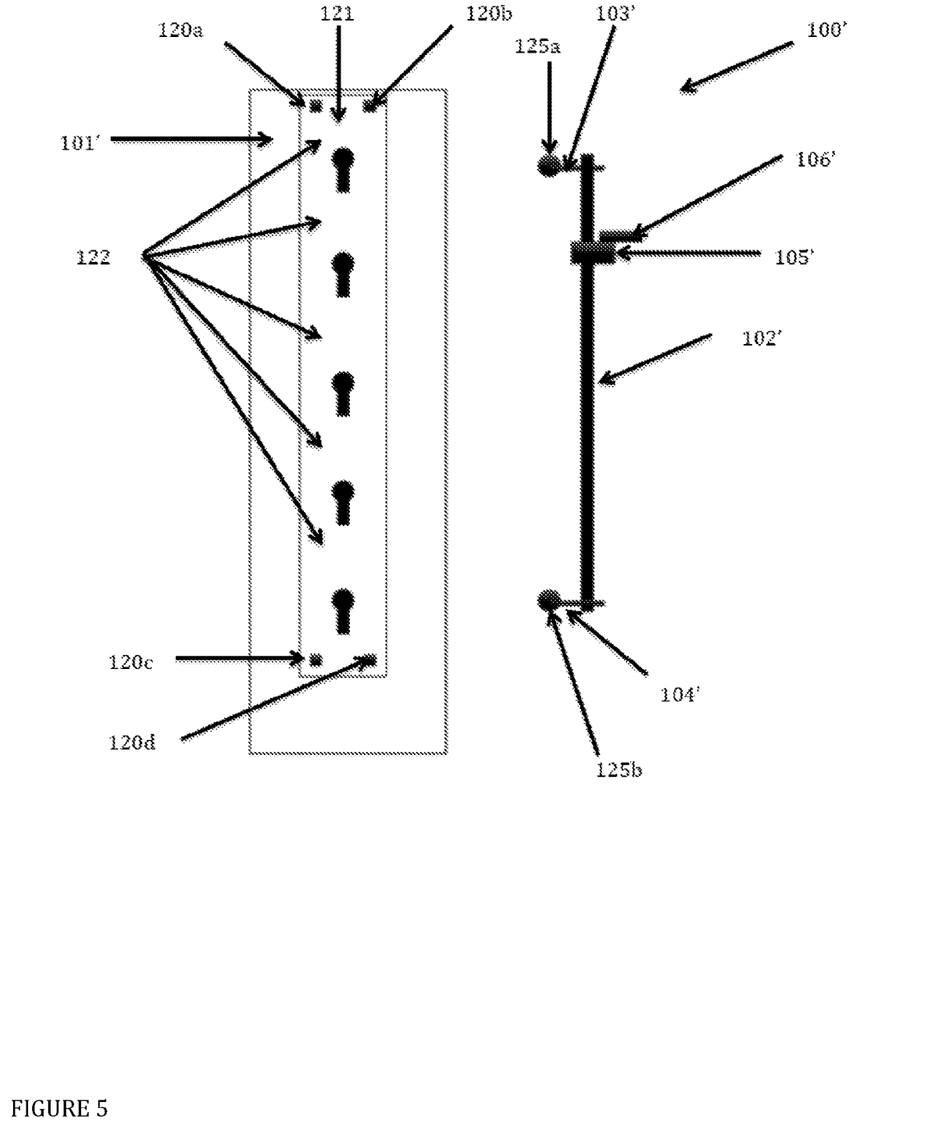
FIG. 5 provides a detailed view of one method of assembling one embodiment of the system according to this invention.

A detail of one embodiment of the fixation system for use according to this invention is shown in FIG. 5, wherein the system components 100' shown in this figure include primed numbers where like numbers are shown in FIG. 1, including a standard 101' to which is affixed via, e.g. four mounting nails, screws, rivets, welds, or the like 120a-d, a cup mounting plate 121 comprising one or a plurality of keyholes 122. Those skilled in the art will appreciate that, rather than affixing a plate 121 to a standard 101', the standard itself may comprise the keyholes 122 without departing from this aspect of the invention. It will also be understood that the precise dimensions and geometry of the keyholes 122 are not limiting—e.g. while in FIG. 5 these are shown as a combination of a circle and a slot recessed into the plate 121, the circle may be replaced by any other shape, such as a square, rectangle or star, so long as the mating part 125a and 125b exhibit mating dimensions and geometry. The mating parts 125a and 125b are fixed via connectors 103' and 104' to shaft 102' which slides through housing 105' when released by an operator to move the attached cup 106' to a desired vertical location along shaft 102'. Each connector 103' and 104' is either moveably fixed to shaft 102', e.g. by an expansion clip, bolts, or the like, to permit maximum flexibility for affixing the shaft 102' to an existing standard with provided keyholes, or each may be welded or otherwise permanently fixed to the upper and lower extremities of the shaft 102'. Each mating part 125a and 125b is fitted into the portion of a keyhole 122 such that, in the embodiment shown in this figure, the circular or spherical mating part 125a and 125b fits through the circular portion of each keyhole, and the entire shaft is then moved downward to ensure engagement of each connector 103' and 104' into the narrow portion of each keyhole 122 to thereby fix the shaft in a fixed orientation in relation to the standard 101'. Each housing 105' with unitary or affixed cup 106' is then positioned, as described above, along the shaft 102' at a desired height along the shaft. The same system is utilized on an opposing standard to thereby provide a pair of cups 106 to support a jump rail 107 therebetween, as show in FIG. 1, as described above.

Figure 2:
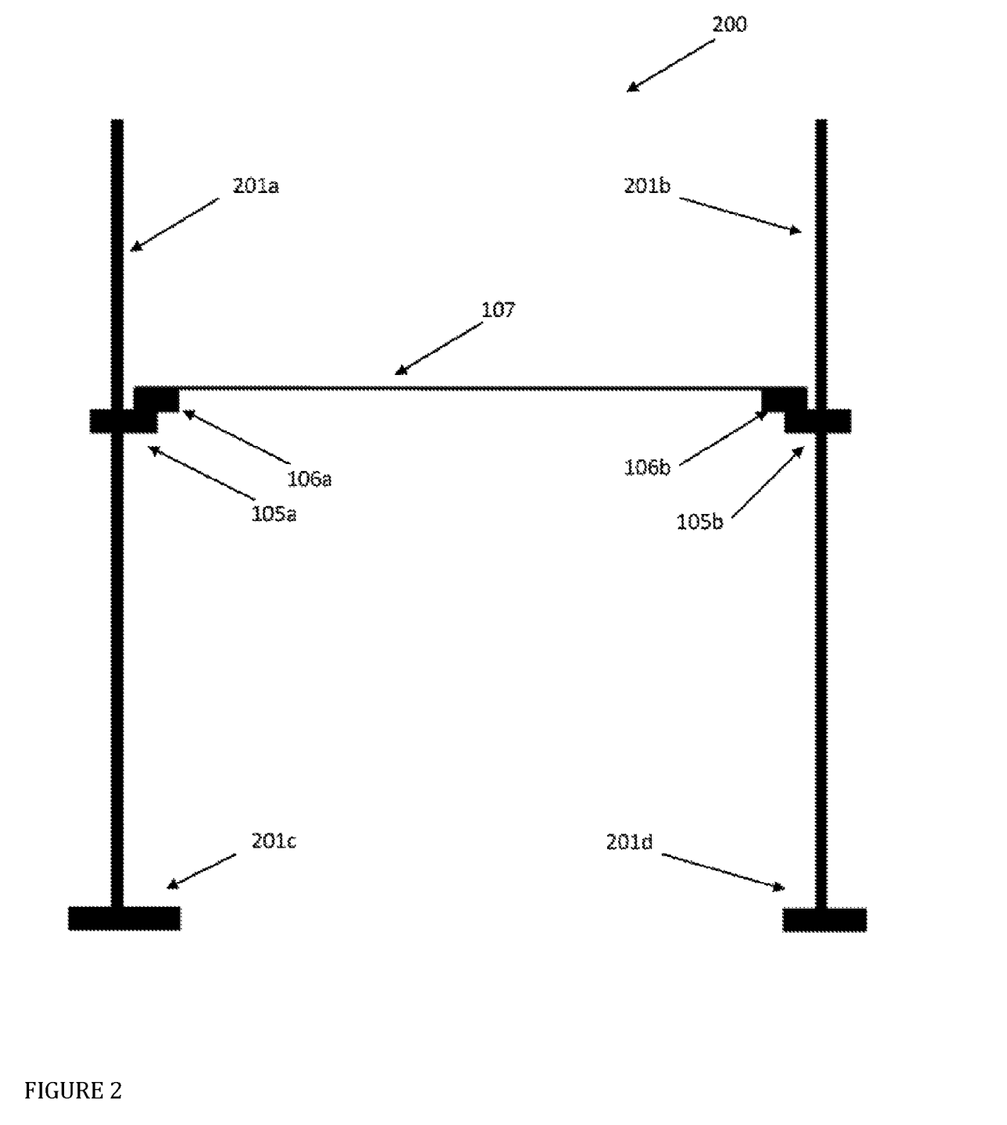
FIG. 2 provides a schematic of a second embodiment of the slideable jump cup system according to this invention.

In a further embodiment 200 of the system according to this invention, see FIG. 2, in which like elements are numbered the same or similarly to those elements shown in FIG. 1, each shaft 201a and 201b is free-standing, with the bottom end of each shaft terminating in a stand, such as 201c and 201d, or is, alternatively, sunk into the ground or concrete, such that each shaft itself serves the function of a standard. In such embodiments, it is desirable for the cross-sectional diameter of each shaft to be sufficient to provide support for the jump cups and the jump rail, without swaying or being in any other way unstable.

According to the above-described embodiments of the invention, each slideable jump cup comprising the combination of the housing 105a and cup 106a, and 105b and 106b, is preferably cast in aluminum, but may alternatively be cast or manufactured from any other material, for example steel, wood, plastic or the like, that is sufficiently rigid and strong to fulfil the function of supporting the jump rail 107 and sustaining any blows or other stresses that may occur when/if a horse were to strike the jump rail 107 with its hoofs as it attempts to jump over the rail. In an alternate embodiment, the jump cup is manufactured from interlockable units to form a unitary structure.

Each jump cup 106a and 106b comprises a housing 105a and 105b each of which comprises at least two elements: (a) a passage through each housing 105a and 105b internal to and along the vertical axis thereof with a geometry and dimension sufficient to accommodate each shaft 102a and 102b respectively, over which each jump cup housing is arranged to be slideably repositionable at a desired position on said shaft, and (b) a cup element 106a and 106b respectively, for holding the jump rail 107 at an elevation defined by the position at which each slideable jump cup housing 105a and 105b is affixed vertically to each shaft 102a and 102b.

Figure 3:
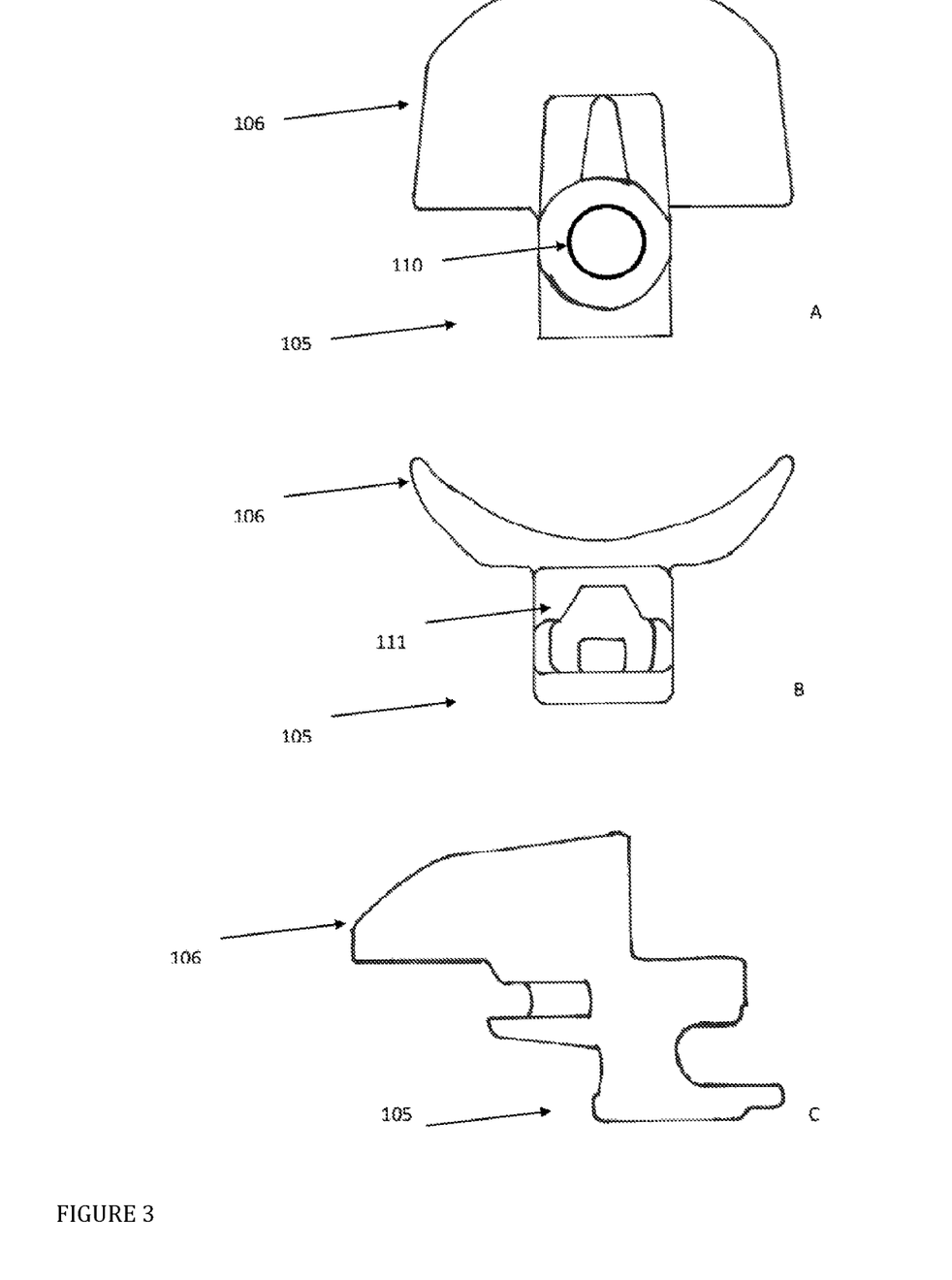
FIG. 3 provides a detailed schematic view of one embodiment of the housing 105 and jump cup 106 according to this invention.

Referring now to FIG. 3, there are provided three schematic views of the slideable jump cup according to this invention comprising the combination of the housing 105a and cup 106a, and 105b and 106b, with each view provided as follows:

A, being a view from the top, looking down at the top of the housing 105 and the through the shaft passage 110 through which the shaft 102 passes;

B, being a rear view, wherein the view shown in A is rotated about the x-axis ninety degrees into the plane of the paper, to reveal shaft position fixation means 111;

while C is a left side view, showing the view of B rotated counter-clockwise ninety degrees about the y-axis.

While the shaft passage 110 is depicted in FIG. 3 as having a circular cross section, to accommodate a substantially cylindrical shaft 102, those skilled in the art will appreciate that the shaft 102 and shaft passage 110 may have any of a number of different cross sectional geometries, including but not limited to circular, square, triangular, elliptical, star-shaped and the like. Those skilled in the art will also appreciate that the shaft 102 may have a diameter of about ½ inch, or ¾ inch or even 1 inch, with the diameter of the shaft passage 110 defined to be slightly larger than the diameter of the shaft that is to pass through the shaft passage 110 and over which the jump cup housing 105 and therefore also the jump cup 106 is slideably moved to a desired position.

The shaft position fixation means 111 in one embodiment comprises a threaded turn screw which is advanced in the housing 105 toward the shaft to lock the housing to a given position on the shaft. In an alternate embodiment, fixation means 111 comprises a combination angular ring and spring system (see detail in FIG. 6, described below), in which the spring biases the ring to lock to the shaft until the spring is depressed to release the ring from its fixed position on the shaft. One representation of the ring and spring mechanism 111 is shown included in the embodiment of the invention shown in FIG. 4. This mechanism is also, preferably, included within the housing shown in FIG. 3, to permit positioning, re-positioning and fixation of that housing/cup assembly along a shaft.

Where the fixation means 111 comprises a ring and spring mechanism to maintain the ring in a set position on the shaft 102 passing vertically through the housing 105, it achieves this function due to an off-axis relationship relative to the shaft 102, to thereby prevent the cup from sliding along the shaft when the housing 105 is set in a desired position on the shaft 102 to thereby maintain a rail set in the cup 106 at a desired elevation.

The ring and spring mechanism 111 comprises a flat ring that is inserted inside housing 105 and a spring that holds the ring inside the housing in place and biased to a locked position for preventing movement along the shaft. A release or trigger tab connected to or unitary with the ring protrudes through an opening in the front of the housing, to provide easy access for releasing the fixation means 111 for re-positioning, and, preferably, another tab is provided in the back of the cylinder for alignment and stability of the ring. This mechanism allows a person to apply force to the release tab to depress the spring to thereby release pressure that the spring otherwise applies to the ring to lock the ring onto the shaft 102 at a desired position. To modify the position of the cup on the shaft, the ring and spring mechanism 111 is depressed to release the housing 105 and jump cup 106, allowing the housing 105 to be re-positioned at a different elevation along the shaft 102.

In a preferred embodiment, the shaft 102 comprises a series of grooves at defined spacing (e.g. 10 cm between grooves) vertically up and down the length of the shaft 102. Preferably the fixation mechanism snaps into each groove as the housing 105 is moved up or down the shaft 102 after depressing the ring and spring mechanism 111. Those skilled in the art will appreciate that other mechanisms known in the art, such as a thumb screw fed into a thread in the housing to lock onto the shaft 102 at a desired height, or any equivalent fixation means known in the art, may be used in place of the ring and spring mechanism 111, to affix the slideable jump cup 106 at a desired vertical position along the shaft 102.

Figure 4:
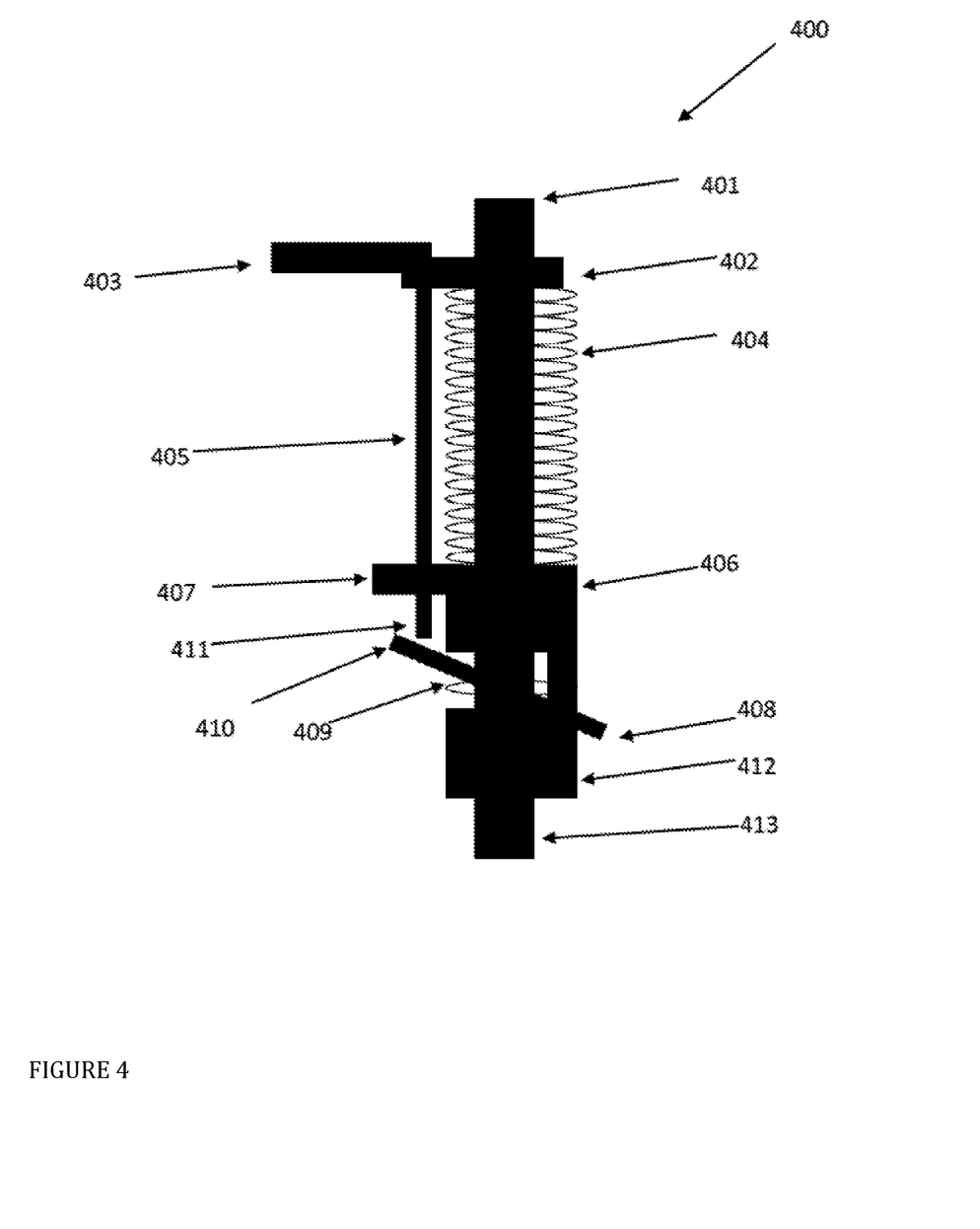
FIG. 4 provides a schematic view of a jump cup housing comprising a safety system for releasing the jump cup from its vertical position along a shaft when a force is applied to the jump cup.

In a further preferred embodiment 400, schematically depicted in side view in FIG. 4, the system comprises a shaft 102 having an upper portion 401 and a lower portion 413 with the slideable cup and housing comprising the remaining elements shown in this figure, which includes in the housing a safety mechanism comprising housing upper portion 402 through which the upper portion 401 of the shaft 102 emerges and to which cup 403 is affixed or with which it is unitary. Below the upper portion of the housing 402 there is provided a spring, 404, or equivalent hydraulic, pneumatic, or like mechanism known in the art, disposed, preferably but not necessarily, concentrically about the shaft 102. Release-trigger 405 is affixed to the underside of housing upper portion 402 and passes through a passage provided in guide post 407 affixed to or unitary with lower housing portion 406 against the upper surface of which the lower portion of spring 404 abutts. A lower extremity 411 of release trigger 405 terminates, during normal operation, just above ring-release tab 410 disposed within the lower housing 406 and biased to off-horizontal locking position on shaft 102 by biasing spring 409. For stability, preferably, the ring-release tab 410 has a portion which extends through the housing and around the shaft 102 as shown in FIG. 6.

Figure 6:
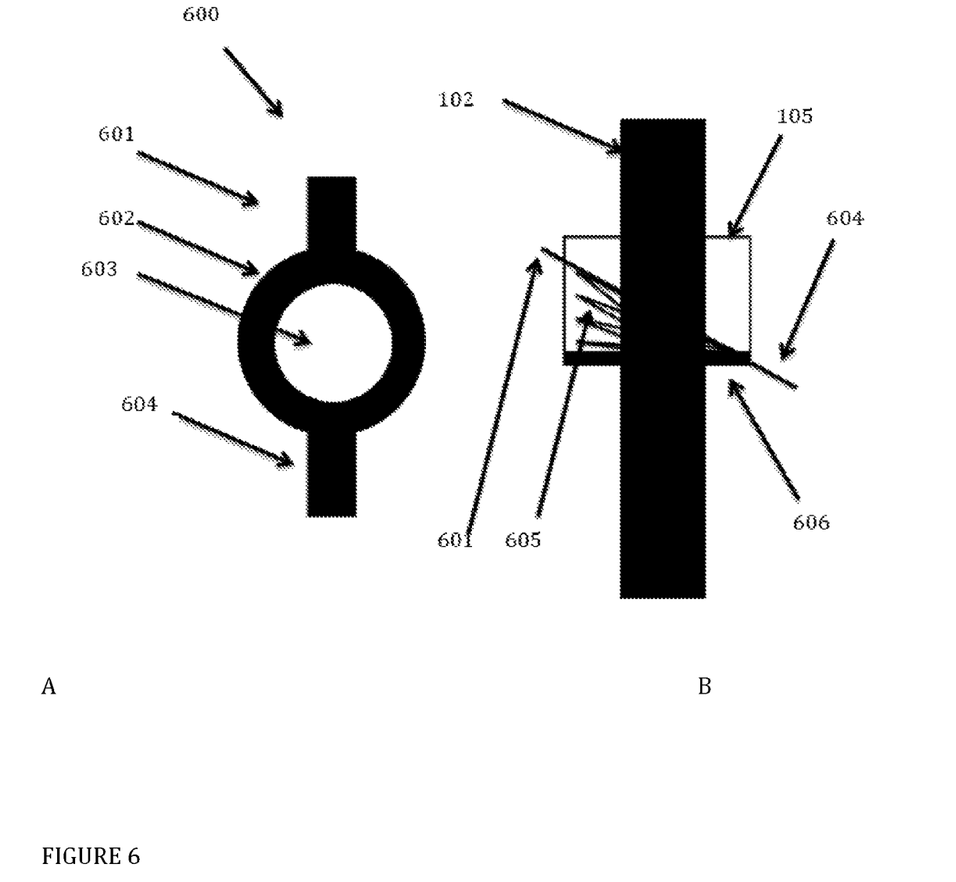
FIG. 6 provides a detailed view of one embodiment of a fixation/release mechanism for controlling the position of the slideable jump cup according to this invention.

In FIG. 6, there is shown one embodiment of a slideable cup fixation and release mechanism 111 comprising, in top view, FIG. 6A, a ring 600 having a release or trigger tab 601, a circular portion 602 for encircling shaft 102 (see FIG. 6B) which passes through shaft passage 603 and terminal stabilizing tab 604. In FIG. 6B, ring 600 is shown in side view in a locked position about shaft 102 and within housing 105 having internal housing base 606. Cup portion 106 is not shown in this figure for purposes of clarity, but it would be fixed to or unitary with housing 105. Release tab 601 and terminal stabilizing tab 604 are shown, each emerging from housing 105. Circular portion 602 and shaft passage 603 cannot be seen in this side-view representation. Spring 605 is shown disposed above internal housing base 606 and impinging on the underside of ring 600, biasing the ring to an angular orientation, rather than a co-axial orientation, thereby locking the housing into position until release tab 601 is depressed to further depress spring 605, thereby allowing ring 600 to assume a co-axial orientation with respect to shaft 102, thereby releasing the shaft to slide through housing 105 to a new vertical position on the shaft. To reposition the housing 105 and cup 106 using this mechanism, the user simply depresses the trigger or release tab 601 thereby causing the ring 600 to drop into co-axial registration with the shaft 102, thereby allowing the housing to be repositioned along the shaft. All of this can be done one-handedly by simply depressing the cup. The other hand or another person could assist with raising or lowering the jump rail 107 or this could be done as part of the repositioning operation by a single person.

Where the release mechanism shown in FIG. 6 is included in the slideable jump cup embodiment shown in FIG. 4 comprising a safety mechanism, in the event a horse strikes the jump rail 107, the housing 105 and slideable jump cup 106 is released from its vertically fixed position along the shaft due to downward pressure exerted on cup portion 403 sufficient to overcome bias provided by spring 404. The spring 404 or other biasing means, such as hydraulic, pneumatic or equivalent means, is chosen to exhibit a desired upward bias sufficient to support the jump rail 107 during normal operation, but to be quickly overcome when jump rail 107 experiences a threshold additional downward pressure or force than that of the jump rail alone 107, as when a horse hoof strikes the rail 107. When the upward bias provided by spring 404 is sufficiently overcome, release trigger 405, and in particular terminal portion 411 thereof, impinges on release or trigger tab 410, (601 in FIG. 6), thereby depressing bias spring 409, (605 in FIG. 6) brining ring 600 into coaxial alignment with shaft 102 and releasing the housing from its vertical position to drop downward along the shaft, thereby minimizing potential injury to the horse, rider or both.

In light of the foregoing disclosure, those skilled in the art will appreciate that this invention comprises, in various permutations and combinations of elements described herein above, the following embodiments:

A horse jump cup system that uses a sliding mechanism to adjust the height of the a jump rail to a desired height in preparation of a horse jump.

A jump cup system that attaches to an already existing jump cup assembly via a shaft to which the sliding jump cup attaches.

A jump cup device, system and method for adjusting jump heights that is faster than traditional jump cup mechanisms and which only requires one hand to adjust the height of a jump bar supported by a standard.

A mechanism for adjusting jump heights that is more precise than traditional jump cup mechanisms.

A jump cup that is always attached to a shaft that is either attached to the jump standard or that is the jump standard itself, so the jump cup does not get lost from the standard because it need not be separated from it.

A slideable jump cup system comprising a shaft which passes vertically through a jump cup housing via a shaft passage defined within the jump cup housing and a fixation means to permit a jump cup unitary with the jump cup housing to be affixed to the shaft to prevent sliding. In this embodiment, the shaft is attached to a jump standard or the shaft itself performs the function of a jump standard. According to this embodiment, the jump cup is always slideably attached to the shaft such that the jump cup cannot be misplaced due to the shaft passing through the housing of the jump cup.

The slideable jump cup system according to this invention comprises a jump cup which includes a shaft passage through a housing portion of the jump cup which is unitary with the housing and a fixation means for fixing the housing to a shaft which passes through the shaft passage.

A kit comprising at least one slideable jump cup, at least one shaft and at least one fixation means for affixing the slideable jump cup to a vertical position on the at least one shaft. Preferably, the kit includes at least two of each of these elements to permit a jump bar to be supported at a desired height and easily adjusted to different desired heights.

A slideable jump cup system comprising a safety feature which drops the jump rail to a lower elevation in the event a horse hoof strikes the jump rail during a jump.

Those skilled in the art will appreciate that the detailed and enabling disclosure provided herein may be varied using equivalents known in the art without departing from the essence of the operative invention described herein. The scope of exclusive rights sought to be defined herein is therefore to be determined by the appended claims, rather than from the specifics of the enabling embodiments as described herein.

What is claimed is:

1. A slideable jump cup system comprising a shaft which passes vertically through a jump cup housing via a shaft passage defined within said jump cup housing and a releaseable fixation means to permit a jump cup fixed to or unitary with said jump cup housing to be affixed to said shaft at a desired vertical position to prevent sliding of said jump cup over said shaft when said releaseable fixation means is not released, and to permit sliding of the jump cup housing over said shaft when said releasable fixation means is released.

2. The slideable jump cup system according to claim 1 wherein said shaft is attached to a jump standard or which itself performs the function of a jump standard.

3. The slideable jump cup system according to claim 1 wherein said jump cup is always slideably attached to said shaft such that the jump cup cannot be misplaced due to said shaft passing through said housing of said jump cup.

4. The slideable jump cup system according to claim 1 wherein said system includes a safety feature whereby, in the event a threshold bias is overcome, a jump rail held in a vertical position is dropped from that vertical position to reduce the potential for harm to a horse or rider jumping over said rail.

5. The slideable jump cup system according to claim 1 wherein said shaft is fixed to a jump standard via a keyhole fixation.

6. The slideable jump cup system according to claim 1 wherein said releaseable fixation means comprises a ring and spring fixation and release mechanism.

7. A slideable jump cup comprising:
   (a) a shaft passage through a housing portion of said jump cup, wherein said jump cup is unitary with said housing, and
   (b) a releasable fixation means for fixing said housing to a shaft which passes through said shaft passage when said releaseable fixation means is not released, and to permit sliding of the jump cup over said shaft housing when said releasable fixation means is released.

8. A method for positioning and re-positioning a jump cup which comprises fitting a slideable jump cup to a shaft which passes vertically through a jump cup housing via a shaft passage defined within said jump cup housing, and fixing said slideable jump cup to a desired vertical position on said shaft by providing a releaseable fixation means to permit a jump cup fixed to or unitary with said jump cup housing to be affixed to said shaft at a desired vertical position to prevent sliding when said releaseable fixation means is not released, and to permit sliding of the jump cup housing over said shaft when said releasable fixation means is released.

* * * * *